United States Patent
Alleston et al.

(10) Patent No.: US 7,174,097 B2
(45) Date of Patent: Feb. 6, 2007

(54) METHOD AND AN APPARATUS FOR SIGNAL TRANSMISSION

(75) Inventors: Steven Alleston, Leamington Spa (GB); Liam Gleeson, Stratford-upon-Avon (GB); Tim Ellingham, Erdington (GB); Tony Walsh, Long Marston (GB)

(73) Assignee: Ericsson AB, Stockholm (SE)

( * ) Notice: Subject to any disclaimer, the term of this patent is extended or adjusted under 35 U.S.C. 154(b) by 24 days.

(21) Appl. No.: 10/498,606

(22) PCT Filed: Nov. 27, 2002

(86) PCT No.: PCT/GB02/05328

§ 371 (c)(1),
(2), (4) Date: Feb. 2, 2005

(87) PCT Pub. No.: WO03/050981

PCT Pub. Date: Jun. 19, 2003

(65) Prior Publication Data

US 2005/0117202 A1 Jun. 2, 2005

(30) Foreign Application Priority Data

Dec. 12, 2001 (GB) ................. 0129717.5

(51) Int. Cl.
*H04B 10/08* (2006.01)
*H04B 17/00* (2006.01)
*H01S 3/00* (2006.01)

(52) U.S. Cl. ............... 398/16; 398/32; 359/334

(58) Field of Classification Search ............... 398/16, 398/32; 359/341.32, 334
See application file for complete search history.

(56) References Cited

U.S. PATENT DOCUMENTS

| 5,930,030 | A | 7/1999 | Scifres | |
|---|---|---|---|---|
| 6,356,383 | B1 * | 3/2002 | Cornwell et al. | 359/334 |
| 6,417,958 | B1 * | 7/2002 | Du et al. | 359/334 |
| 6,433,922 | B1 * | 8/2002 | Ghera et al. | 359/334 |
| 6,452,721 | B2 * | 9/2002 | Deguchi et al. | 359/341.33 |
| 6,456,426 | B1 * | 9/2002 | Bolshtyansky et al. | 359/334 |

(Continued)

FOREIGN PATENT DOCUMENTS

EP 0 910 141 A1 4/1999

(Continued)

OTHER PUBLICATIONS

*Pump Interactions in a 100-nm Bandwidth Raman Amplifier*, IEEE Photonics Technology Letters, IEEE Inc., New York, H. Kidorf, et al., May 1, 1999, pp. 530-532.

*Primary Examiner*—Deandra M. Hughes
(74) *Attorney, Agent, or Firm*—Kirschstein, et al.

(57) ABSTRACT

A method and apparatus for transmitting a plurality of signals having different wavelengths through a length of optical cable which is caused to provide distributed gain by being subjected to Raman pumping at a plurality of pump wavelengths, the power levels of the pump signals being in a set ratio or ratios for providing, preferably, a flat gain profile over the range of wavelengths of the plurality of signals, the set power levels of the pump signals being determined from the measured effects of the pump signals on a probe signal and in relation to the wavelength separations among the probe signal, the pump signals and the plurality of signals having different wavelengths.

13 Claims, 1 Drawing Sheet

U.S. PATENT DOCUMENTS

| | | |
|---|---|---|
| 6,850,360 B1 * | 2/2005 | Chen et al. .................. 359/334 |
| 6,930,823 B2 * | 8/2005 | Nakamoto et al. ........... 359/334 |
| 6,963,681 B2 * | 11/2005 | Mao et al. .................... 385/27 |
| 7,031,618 B2 * | 4/2006 | Harasawa .................... 398/177 |
| 2003/0184848 A1 * | 10/2003 | Bayart et al. ................ 359/334 |
| 2005/0078351 A1 * | 4/2005 | Avallone et al. ............ 359/334 |
| 2005/0179989 A1 * | 8/2005 | Osaka ......................... 359/334 |

FOREIGN PATENT DOCUMENTS

| | | |
|---|---|---|
| WO | 2 334 397 A | 8/1999 |
| WO | WO 00/49721 | 8/2000 |
| WO | WO 00/73826 A2 | 12/2000 |
| WO | WO 02/17520 A1 | 2/2002 |

\* cited by examiner

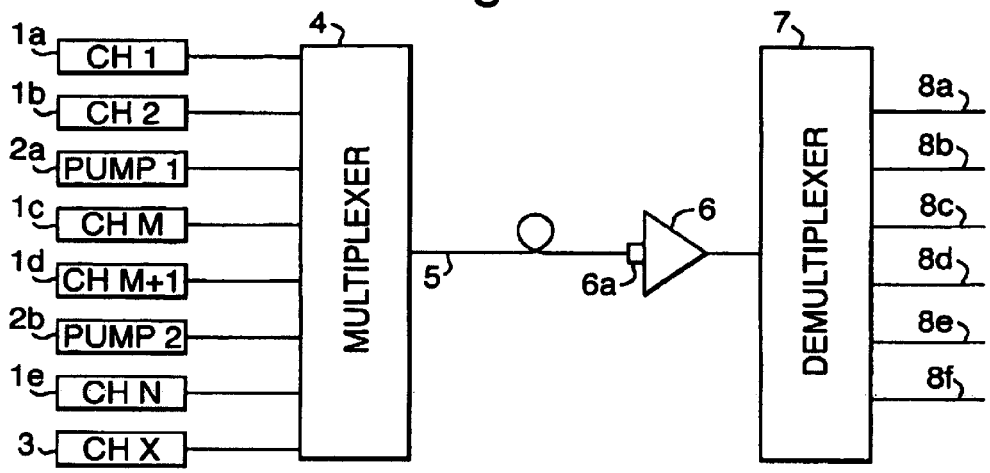
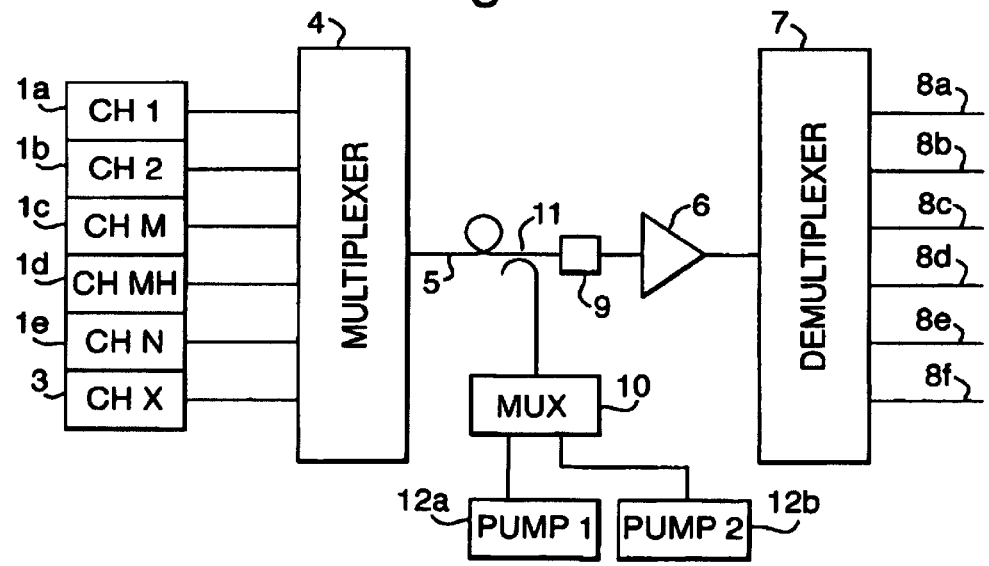

METHOD AND AN APPARATUS FOR SIGNAL TRANSMISSION

The invention relates to a method and apparatus for signal transmission, especially optical signal transmission.

A length of optical signal transmission cable carrying a plurality of signals having different wavelengths exhibits the Raman effect of transferring energy to longer wavelength signals from shorter-wavelength signals as the signals travel through the length of optical signal transmission cable.

WO 00 49721A discloses an optical transmission system with pump signals for providing Raman gain over an optical signal wavelength range. The effect of the pump signals is determined by an analyser such as an optical spectrum analyser, a tunable receiver and a bit error rate test device. Such an analysis is complex.

U.S. Pat. No. 5,930,030 and Kodort H et al. "Pump interactions in a 100 mm Bandwidth Raman Amplifier" IEEE Photonics. Technology Letters, vol. 11, no. 5. 1 May 1999, pp 104–1135 also disclose an optical transmission system with a plurality of pump signals for providing Raman gain.

It is an object of the present invention to provide distributed gain in a signal transmission cable that exhibits the Raman effect by the use of the Raman effect.

The invention provides a method of transmitting a plurality of signals having different wavelengths through a length of signal transmission cable which exhibits the Raman effect of transferring energy to longer-wavelength signals from shorter-wavelength signals as the signals travel through the length of signal transmission cable, including the steps of:

providing a plurality of pump signals for providing energy for transfer to the plurality of signals travelling through the length of signal transmission cable, providing a selected-wavelength probe signal at wavelength different from the wavelengths of the plurality of pump signals, transmitting the probe signal, and the plurality of pump signals one at a time in turn through the length of transmission cable, determining the changes in power level of the probe signal resulting from the pump signals, setting the power levels of the pump signals to provide a selected gain profile for the plurality of signals having different wavelengths, the power levels of the pump signals being determined in dependence on the changes in power level of the probe signal and in relation to the wavelength differences among the probe signal, the pump signals and the plurality of signals having different wavelengths and continuing to transmit the pump signals at the ratio or ratios of the set power levels along with the plurality of signals having different wavelengths through the length of signal transmission cable.

Usually, the ratio or ratios of the set power levels of the pump signals are so selected as to provide a substantially flat gain profile for the plurality of signals having different wavelengths.

Preferably, the wavelength of the probe signal lies outside the range of wavelengths of the plurality of signals having different wavelengths.

In one method, a wavelength of a supervisory channel is used as the probe signal.

In an alternative method, a selected one of the plurality of signals having different wavelengths is used as the probe signal.

One method includes the step of providing a plurality of pump signals for providing energy for transfer in the forward direction to the plurality of signals travelling through the length of signal transmission cable.

An alternative method includes the step of providing a plurality of pump signals for providing energy for transfer in the reverse direction to the plurality of signals travelling through the length of signal transmission cable.

The invention also provides an apparatus for transmitting a plurality of signals having different wavelengths through a length of signal transmission cable including:

a length of signal transmission cable which exhibits the Raman effect of transferring energy to longer-wavelength signals from shorter-wavelength signals as the signals travel through the length of signal transmission cable, a plurality of signal transmitters, connected to energise the length of transmission cable, for providing signals having the plurality of different wavelengths to the length of transmission cable, a plurality of pump signal transmitters, connected to provide energy for transfer to the plurality of signals travelling through the length of signal transmission cable, a selected-wavelength probe signal transmitter, connected to energise the length of transmission cable, operable at wavelength different from the wavelengths of the plurality of pump signals, the apparatus being operated by:

transmitting the probe signal, and the plurality of pump signals one at a time in turn through the length of transmission cable, determining the changes in power level of the probe signal resulting from the pump signals, setting the power levels of the pump signals to provide a selected gain profile for the plurality of signals having different wavelengths, the power levels of the pump signals being determined in dependence on the changes in power level of the probe signal and in relation to the wavelength differences among the probe signal, the pump signals and the plurality of signals having different wavelengths and continuing to transmit the pump signals at the ratio or ratios of the set power levels along with the plurality of signals having different wavelengths through the length of signal transmission cable.

In one form of the apparatus, the length of transmission cable is one of a plurality of lengths of transmission cable connected in series.

Preferably, the form of the apparatus which includes a plurality of lengths of transmission cable includes a plurality of amplifier stages which separate the plurality of lengths of transmission cable from one another.

Preferably, the length of transmission cable is a length of optical cable and, preferably, the plurality of lengths of transmission cable are lengths of optical cable.

In one form of the apparatus, the plurality of pump signals transmitters are so connected as to provide energy in the forward direction for transfer to the plurality of signals travelling through the length of signal transmission cable.

In an alternative form of the apparatus, the plurality of pump signal transmitters are so connected as to provide energy in the reverse direction for transfer to the plurality of signals travelling through the length of transmission cable.

A method and apparatus for signal transmission in accordance with the invention will now be described, by way of example only, with reference to the accompanying drawings in which:

FIG. 1 represents a first apparatus for providing distributed gain in a length of optical signal transmission cable and FIG. 2 represents a second apparatus for providing distributed gain in a length of optical signal transmission cable.

Referring to FIG. 1 of the accompanying drawings, the first apparatus includes a plurality of signal transmitters 1a, 1b, 1c, 1d and 1e, operable at a plurality of different wavelengths, connected to a plurality of the input ports of a multiplexer 4 for launching the plurality of signals onto a length of optical signal transmission cable 5, one end of which is connected to the output port of the multiplexer 4. The other end of the length of optical signal transmission cable 5 is connected to the input port 6a of an amplifier 6 and the output port of the amplifier 6 is connected to the input port of a demultiplexer 7. The demultiplexer 7 separates the plurality of signals and provides the separated signals on output ports 8a, 8b, 8c, 8d and 8e. The wavelengths provided by the signal transmitters 1a, 1b, 1c, 1d and 1e constitute the working signal wavelengths of the first apparatus for signal transmission.

The input port 6a of the amplifier 6 includes a monitor point at which the power levels of the signals carried by the length of optical signal transmission cable 5 may be monitored.

A probe signal transmitter 3 is connected to an input port of the multiplexer 4 for launching the probe signal onto the length of optical signal transmission cable 5 and an output port 8f of the demultiplexer 7 provides the probe signal after it has travelled through the length of optical signal transmission cable 5 and the amplifier 6.

A first pump signal transmitter 2a and a second pump signal transmitter 2b are connected to input ports of the multiplexer 4 for launching the pump signals onto the length of optical signal transmission cable 5.

In the operation of the first apparatus for signal transmission, the probe signal is launched onto the length of optical signal transmission cable 5 by the probe transmitter 3 and the probe signal is monitored at the input port 6a of the amplifier 6 after the probe signal has travelled through the length of optical signal transmission cable 5. The power level of the probe signal at the input port 6a of the amplifier 7 is measured and noted.

The first pump signal from the first pump signal transmitter 2a is now launched onto the length of optical signal cable 5 with the probe signal and the power level of the first pump signal at the input port 6a of the amplifier 6 is measured and noted. A corresponding measurement is made for the probe signal at the input port 6a of the amplifier 6 and the measured value is noted. The measured power level of the probe signal at the input port 6a of the amplifier 6 will have increased with the introduction of the first pump signal onto the length of optical signal transmission cable 5 as a result of Raman pumping of the probe signal by the first pump signal. The increase is noted.

The first pump signal transmitter 2a is now switched off and the second pump signal from the second pump signal transmitter 2b is launched onto the length of optical signal transmission cable 5 with the probe signal and the power level of the second pump signal at the input port 6a of the amplifier 6 is measured and noted. A corresponding measurement is made for the probe signal at the input port 6a of the amplifier 6 and noted, for determining the increase in the power level of the probe signal at the input port 6a of the amplifier 7 as a result of Raman pumping of the probe signal by the second pump signal.

The effect of the first pump signal on the probe signal and the wavelength separation between these signals being known, the Raman gain per unit of pump power is determined for the first pump signal and used to predict corresponding Raman gains for the working signal wavelengths provided by the signal transmitters 1a, 1b, 1c, 1d and 1e.

The effect of the second pump signal on the probe signal and the wavelength separation between these signals is also known and the Raman gain per unit of pump power is determined for the second pump signal. The Raman gain per unit of pump power for the second pump signal is used to predict corresponding Raman gains for the working signal wavelengths provided by the signal transmitters 1a, 1b, 1c, 1d and 1e.

The power levels of the first and second pump signal transmitters 2a and 2b are now adjusted using the results of the above determinations in order to obtain specific predicted Raman gains for the working signal wavelengths provided by the signal transmitters 1a, 1b, 1c, 1d and 1e. The ratio of the power levels of the pump signals determine the overall result.

The result usually sought is that the signals detected at the output ports 8a, 8b, 8c, 8d and 8e of the demultiplexer 7 show a constant gain in relation to the signals transmitted by the signal transmitters 1a, 1b, 1c, 1d and 1e. However, circumstances may dictate a choice of result other than the usual result.

The first apparatus permits the transfer of energy in the forward direction of transmission along the length of transmission cable from the pump transmitters.

Referring to FIG. 2 of the accompanying drawings, the second apparatus for signal transmission, as in FIG. 1., includes the plurality of signal transmitters 1a, 1b, 1c, 1d and 1e connected to a plurality of the input ports of a multiplexer 4 for launching the plurality of signals onto a length of optical signal transmission cable 5, one end of which is connected to the output port of the multiplexer 4. As in FIG. 1, the other end of the length of optical signal transmission cable 5 is connected to the input port of an amplifier 6 and the output port of the amplifier 6 is connected to the input port of a demultiplexer 7 which separates the plurality of signals and provides the separated signals on output ports 8a, 8b, 8c, 8d and 8e.

As in FIG. 1, a probe signal transmitter 3 is connected to an input port of the multiplexer 4 for launching the probe signal onto the length of optical signal transmission cable 5 and an output port 8f of the demultiplexer 7 provides the probe signal after it has travelled through the length of optical signal transmission cable 5 and the amplifier 6.

Referring to FIG. 2, a power monitor 9 is connected between the input port of the amplifier 6 and the length of optical signal transmission cable 5 for monitoring the power levels of the signals at the input port of the amplifier 6.

A third pump signal transmitter 12a and a fourth pump signal transmitter 12b are coupled, through a coupling arrangement 11, to the length of optical signal transmission cable 5 by way of a second multiplexer 10.

The manner of operation of the second apparatus shown in FIG. 2 is substantially the same as the manner of operation of the first apparatus shown in FIG. 1.

Although FIG. 2 includes a power monitor 9, the FIG. 1 arrangement of a monitoring point at the input port of the amplifier 6 could be used as an alternative to the power monitor.

In FIG. 2, the coupling arrangement 11 and second multiplexer 10 function as an alternative arrangement to that of FIG. 1 for launching pump signals onto the length of optical signal transmission cable 5 and the power monitor 11 measures the power levels of the signals at the input port of the amplifier 6.

The coupling arrangement 11 shown in FIG. 2 may be such as to allow either forward or reverse transfer of energy to the length of optical transmission cable from the pump transmitters.

Although two signal pump transmitters are included in the apparatus shown in the accompanying drawings, more than two signal pump transmitters may be used and it will be understood that, in a wavelength division multiplexed (WDM) apparatus, the number of pump transmitters is dependent on the number of wavelengths available in order to achieve gain flatness or some other selected condition over the range of wavelengths. As before, the ratios of the power levels of the pump signals determine the overall result.

In both the first and second apparatus, the probe signal transmitter 3 may operate at an out-of-band wavelength or the wavelength of an optical supervisory channel used in the apparatus. Alternatively, a signal transmitter of the apparatus may be selected to serve as the probe signal transmitter.

The apparatus may include a single length of optical signal transmission cable a shown in FIGS. 1 and 2 or may include a plurality of lengths of optical signal transmission cable connected in series and separated by Amplifier stages.

The above operation may be performed as a part of the normal start-up procedure of the apparatus or as a dedicated commissioning procedure. Once the ratio or the ratios of the power levels are set, the pump powers and an average gain are monitored dynamically. The gain profile which is usually a flat gain profile is then maintained since changes due, for example, to thermal effects and the effects of re-splicing affect the pump wavelengths equally. Changes in gain are accounted for by adjusting the pump powers while maintaining the power ratio or ratios originally determined.

The results obtained by performing the above method may be applied to take account of variations in pump wavelength due to manufacturing tolerance, say, when a pump is replaced by a similar pump. The method is applicable to a co-pumping architecture where the pump signal travels in the same direction as the working signals or a counter-pumping architecture where the pump signal opposite direction to the working signals.

The amount of gain obtained at a particular pump wavelength and, consequently, the required ratio or ratios differ according to pump power for different types of optical fibre, production batch and must be determined on a span by span basis. The above method determines experimentally a ratio or ratios of peak gains required from each pump for individual fibre types and spans by determining the amount of gain for a selected pump.

It is easy and relatively cheap to measure the pump powers during normal operation of the apparatus whereas it is difficult and expensive to monitor the gain profile of the apparatus. Moreover, even if the gain profile is monitored during normal operation, it is difficult to determine which pump signal or pump signals should be adjusted in power and in which sense to achieve a desired gain profile.

Raman amplification is found to be useful for providing distributed gain in long-haul and ultra-long-haul fibre optic transmission systems, improving the signal to noise ratio and the Q of the signal.

The method of the invention is especially useful where the apparatus is remotely controlled because of its siting or for any other reason.

The invention claimed is:

1. A method of transmitting a plurality of signals having different wavelengths through a length of signal transmission cable which exhibits a Raman effect of transferring energy to longer-wavelength signals from shorter-wavelength signals as the signals travel through the length of signal transmission cable, comprising the steps of:
   a) providing a plurality of pump signals having wavelengths for providing energy for transfer to the plurality of signals traveling through the length of signal transmission cable;
   b) providing a selected-wavelength probe signal at a wavelength different from the wavelengths of the plurality of pump signals, the wavelength of the probe signal constituting a wavelength of a supervisory channel;
   c) transmitting the probe signal at the wavelength of the supervisory channel and the plurality of pump signals, one at a time, in turn, through the length of transmission cable;
   d) determining changes in power level of the probe signal resulting from the pump signals;
   e) setting power levels of the pump signals to provide a selected gain profile for the plurality of signals having different wavelengths, the power levels of the pump signals being determined in dependence on the changes in power level of the probe signal and in relation to differences in wavelengths among the probe signal, the pump signals and the plurality of signals having different wavelengths; and
   f) continuing to transmit the pump signals at a ratio of set power levels along with the plurality of signals having different wavelengths through the length of signal transmission cable.

2. The method as claimed in claim 1, wherein the ratio of the set power levels is selected to render the gain profile substantially flat for the plurality of signals having different wavelengths.

3. The method as claimed in claim 1, wherein the wavelength of the probe signal lies outside a range of the wavelengths of the plurality of signals having different wavelengths.

4. The method as claimed in claim 1, wherein a selected one of the plurality of signals having different wavelengths is used as the probe signal.

5. The method as claimed in claim 1, wherein the step of providing the plurality of the pump signals is performed in a forward direction to a direction along which the plurality of signals travel through the length of signal transmission cable.

6. The method as claimed in claim 1, wherein the step of providing the plurality of the pump signals is performed in a reverse direction to a direction along which the plurality of signals travel through the length of signal transmission cable.

7. An apparatus for transmitting a plurality of signals having different wavelengths, comprising:
   a) a length of signal transmission cable which exhibits a Raman effect of transferring energy to longer-wavelength signals from shorter-wavelength signals as the signals travel through the length of signal transmission cable;
   b) a plurality of signal transmitters connected to energize the length of transmission cable, for providing the plurality of signals having the different wavelengths to the length of transmission cable;
   c) a plurality of pump signal transmitters connected to provide a plurality of pump signals having wavelengths for providing energy for transfer to the plurality of signals traveling through the length of signal transmission cable;

d) a selected-wavelength probe signal transmitter connected to energize the length of transmission cable, and being operable to provide a selected-wavelength probe signal at a wavelength different from the wavelengths of the plurality of pump signals, the wavelength of the probe signal constituting a wavelength of a supervisory channel;

e) means for transmitting the probe signal at the wavelength of the supervisory channel and the plurality of pump signals, one at a time, in turn, through the length of transmission cable;

f) means for determining changes in power level of the probe signal resulting from the pump signals;

g) means for setting power levels of the pump signals to provide a selected gain profile for the plurality of signals having different wavelengths, the power levels of the pump signals being determined in dependence on the changes in power level of the probe signal and in relation to differences in wavelengths among the probe signal, the pump signals and the plurality of signals having different wavelengths; and h) means for continuing to transmit the pump signals at a ratio of set power levels along with the plurality of signals having different wavelengths through the length of signal transmission cable.

8. The apparatus as claimed in claim 7, wherein the length of transmission cable is one of a plurality of lengths of transmission cable connected in series.

9. The apparatus as claimed in claim 8, comprising a plurality of amplifier stages which separate the plurality of lengths of transmission cable from one another.

10. The apparatus as claimed in claim 7, wherein the length of transmission cable is a length of optical cable.

11. The apparatus as claimed in claim 8, wherein the plurality of lengths of transmission cable are lengths of optical cable.

12. The apparatus as claimed in claim 7, wherein the plurality of pump signal transmitters are so connected as to provide energy in a forward direction for transfer in a direction with the plurality of signals traveling through the length of signal transmission cable.

13. The apparatus as claimed in claim 7, wherein the plurality of pump signal transmitters are so connected as to provide energy in a reverse direction for transfer in a direction opposite to the plurality of signals traveling through the length of transmission cable.

* * * * *